(12) United States Patent
Grohn

(10) Patent No.: US 6,622,005 B1
(45) Date of Patent: Sep. 16, 2003

(54) METHODS, SYSTEMS AND DEVICES FOR CASCADED COMMUNICATIONS

(75) Inventor: Ossi Ilari Grohn, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/517,966

(22) Filed: Mar. 3, 2000

(51) Int. Cl.$^7$ ................................................. H04B 1/60
(52) U.S. Cl. ........................... 455/9; 455/423; 455/424; 455/422.1; 370/349; 370/238
(58) Field of Search ................................ 455/422, 423, 455/424, 425, 7, 9, 422.1; 370/349, 238, 389

(56) References Cited

U.S. PATENT DOCUMENTS

| | | | | |
|---|---|---|---|---|
| 5,402,470 A | * | 3/1995 | DeVaney | 379/59 |
| 5,774,456 A | | 6/1998 | Ellebracht et al. | 370/242 |
| 5,926,757 A | * | 7/1999 | Luijten et al. | 455/422 |
| 5,943,607 A | * | 8/1999 | Singer | 455/31.3 |
| 5,970,122 A | * | 10/1999 | LaPorta et al. | 379/67.1 |
| 6,130,881 A | * | 10/2000 | Stiller et al. | 370/238 |
| 6,219,542 B1 | * | 4/2001 | Aas et al. | 455/422 |
| 6,256,306 B1 | * | 7/2001 | Bellenger | 370/389 |
| 6,308,073 B1 | * | 10/2001 | Petty et al. | 455/456 |
| 6,339,709 B1 | * | 1/2002 | Gladwin et al. | 455/456 |
| 6,400,281 B1 | * | 6/2002 | Darby et al. | 455/7 |
| 6,421,731 B1 | * | 7/2002 | Ciotti et al. | 709/238 |

FOREIGN PATENT DOCUMENTS

| | | |
|---|---|---|
| WO | WO 00/79735 | 12/2000 |

OTHER PUBLICATIONS

"American National Standard for Telecommunications—Network–to–Customer Installation—DSI Metallic Interface," American National Standards Institute, ANSI T1.403–1995, pp. i–49.

"A Technical Report on Application Guidelines for Use of the DS 1 Extended Superframe Format Data Link," Prepared by TIE1.2 Working Group on Wideband Interfaces, Committee T1–Telecommunications, Report No. 12, Sep. 1991, pp. i–5.

"ISDN," http://freesoft.org/CIE/Topics/123.htm, 2 pgs.

"ISDN Management Information Base using SMIv2," G. Roeck, Editor, Cisco Systems, Mar. 1997, http://freesoft.org/CIE/RFC/Orig/rfc2127.txt, 41 pgs.

"Q.921 Protocol Overview," http:/freesoft.org/CIE/Topics/125.htm, 4 pgs.

"Integrated Services Digital Network (ISDN)," http://www.cisco.com/univercd/cc/td/doc/cisintwk/ito$_{13}$ doc/isdn.htm, 5 pgs.

"Layer 2 —Data Link Layer," http://www.ralphb.net/ISDN/proto__12.html, 2 pgs.

International Search Report, PCT/US01/01771, May 23, 2001.

* cited by examiner

Primary Examiner—Edward F. Urban
Assistant Examiner—Lana Le
(74) Attorney, Agent, or Firm—Myers Bigel Sibley & Sajovec

(57) ABSTRACT

A Performance Report Message or other message is received from a first device at a second device. The received message is revised such that a value of a Terminal Endpoint Identifier field in the message is revised according to a predetermined transformation, e.g., by incrementing the value in the Terminal Endpoint Identifier field. The revised message is then transmitted from the second device to a third device. The first, second and third devices may comprise devices of a wireless communications network, such as radio heads and/or a control part (COP). The message is preferably received over a first T1 link connecting the first and second devices, and the revised message is preferably transmitted over a second T1 link connecting the second and third devices. The revised message may be received at the third device, the revised value of the Terminal Endpoint Identifier field of the received revised message recovered, and a communications link and/or device to which the revised message pertains identified based on the recovered revised value of the Terminal Endpoint Identifier field, preferably in conjunction with a value in a Command/Response field in the received revised message.

35 Claims, 7 Drawing Sheets

METHODS, SYSTEMS AND DEVICES FOR CASCADED COMMUNICATIONS

BACKGROUND OF THE INVENTION

The present invention relates to communications systems and methods, and more particularly, to communications systems including devices, such as wireless radio heads, base stations or other transceiver apparatus, connected in cascade by respective communications links, such as T1 links.

Wireless communications systems are commonly employed to provide voice and data communications to subscribers. For example, analog cellular wireless communications systems, such as those designated AMPS (Advanced Mobile Phone System), NMT(Nordic Mobile Telephone)-450 and NMT-900, have long been deployed successfully throughout the world. Digital cellular wireless communications systems such as those conforming to the North American standard IS-54 and the European standard GSM (Global Systems for Mobile Communications) have been in service since the early 1990's. More recently, a wide variety of wireless digital services broadly labeled as PCS (Personal Communications Services) have been introduced, including advanced digital cellular systems conforming to standards such as TIA/EIA-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular wireless communication system 20. The cellular wireless communications system 20 may include one or more terminals 22, such as mobile terminals, radiotelephones or similar devices, communicating with a plurality of cells 24 served by base stations 26 and a mobile telephone switching office (MTSO) 28. Although only three cells 24 are shown in FIG. 1, a typical cellular system may include hundreds of cells, may include more than one MTSO, and may serve thousands of terminals.

The cells 24 generally serve as nodes in the communication system 20, from which links are established between terminals 22 and the MTSO 28, by way of the base stations 26 serving the cells 24. Each cell 24 typically has allocated to it one or more dedicated control channels and one or more traffic channels. A control channel is a dedicated channel used for transmitting cell identification and paging information. The traffic channels carry the voice and data information. Through the cellular system 20, a duplex radio communication link may be effected between two mobile terminals 22 or between a mobile terminal 22 and a landline telephone user 32 through a public switched telephone network (PSTN) 34. The function of the base station 26 is to handle radio communication between a cell 24 and mobile terminals 22. In this capacity, the base station 26 functions as a relay station for data and voice signals.

As illustrated in FIG. 2, a conventional indoor wireless network 200 that communicates with one or more mobile terminals 22' includes one or more radio heads 210, a Control Part (COP) 220 (sometimes referred to as a Control and Radio Interface;(CRI) or Radio Control Interface (RCI)), and a mobile switching center (MSC) 230. The radio heads 210 may include one or more radio transceivers and are typically distributed around a building or corporate campus, and provide air interface (radio coverage) functions for cells 240 in under control of the COP 220 in a manner similar to the base stations 26 illustrated in FIG. 1. The air interface implemented by the radio heads 210 and COP 220 may take many forms, including, but not limited to, time division multiple access (TDMA) (e.g., per GSM, IS-136 or similar standards), code division multiple access (CDMA) (e.g., per IS-95, CDMA2000, or similar standards), and more traditional frequency division multiple access (FDMA). Although FIG. 2 illustrates two cells 240 served by the respective radio heads 210, a typical indoor wireless network may have several cells, and each cell may be serviced by one or more radio heads.

The radio heads 210 are connected to the COP 220 by communications links 215 over which data (e.g., frames for wireless communications) and control information are conveyed. In an exemplary RBS 884 Pico Cellular Base Station produced by Ericsson, Inc., the assignee of the present application, the links 215 are T1 (also referred to as DS-1) links which convey messages using a proprietary protocol which includes elements of the Link Access Protocol D (LAPD) Layer 2 protocol used on channels under the Integrated Digital Services Network (ISDN) suite of protocols.

As is well known to those skilled in the art, ISDN provides services that offer "B" channels that typically carry user data, and "D" channels that typically carry control and signaling information (with some user data transmission under certain circumstances). ISDN Basic Rate Interface (BRI) includes two B channels and one D channel, and its physical layer is specified in ITU-T I.430. ISDN Primary Rate Interface (PRI), typically transmitted over T1 links, includes 23 B channels and one channel in North America, and its physical layer is specified in ITU-T I.431. The channel signaling protocol includes Layers 1–3, which follow the Open System Interconnect (OSI) model. The Physical Layer (Layer 1) protocol is specified in ITU-T I.431. The Data Link Layer (Layer 2) protocol is referred to as LAPD, as specified in the Q.921 Recommendations. The Network Layer (Layer 3) protocol is specified in the ITU Q.931 Recommendations.

On a typical T1 link such as one the links 215 of the indoor wireless system 200 of FIG. 2, information is typically transmitted at 1544 kilobits per second (kb/s), in 193 bit Layer 2 frames that occur every 125 microseconds ($\mu$sec). A frame includes a 192-bit payload preceded by a framing (F) bit. An Extended SuperFrame (ESF) includes 24 consecutive frames, with the F bits being used to provide framing functions, a block error check (CRC) channel and a data link (DL). The ESF DL may be used for transmission of scheduled (periodic) maintenance messages and unscheduled priority and control codewords related to maintenance of transmission quality on the T1 link.

A structure for a Performance Report Message (PRM) transmitted on an ESF DL is provided in Table 1. A PRM includes a 13-byte information block bracketed by opening and closing flag bytes. The information bytes, including a header and a footer, are structured as an Unnumbered Information frame according to the LAPD protocol. The data content (body) of the frame is a concatenation of four 2-byte. representations of signal performance for respective one second periods. Each PRM typically includes data for the four most recent seconds, which can provide redundancy if the PRM is corrupted in transmission. A PRM is typically transmitted once every second, and is transmitted in 30 milliseconds (msec).

TABLE 1

PRM Format

| Byte | Bit Assignments | | | | | | | | Description | |
|------|----|----|----|----|----|----|----|----|----|----|
| | 8 | 7 | 6 | 5 | 4 | 3 | 2 | 1 | | |
| 1 | FLAG | | | | | | | | | |
| 2 | SAPI | | | | | | C/R | EA | HEADER | |
| 3 | TEI | | | | | | | EA | | |
| 4 | CONTROL | | | | | | | | | |
| 5 | G3 | LV | G4 | U1 | U2 | G5 | SL | G6 | FIRST | |
| 6 | FE | SE | LB | G1 | R | G2 | $N_m$ | $N_1$ | SECOND | |
| 7 | G3 | LV | G4 | U1 | U2 | G5 | SL | G6 | SECOND | |
| 8 | FE | SE | LB | G1 | R | G2 | $N_m$ | $N_1$ | SECOND | BODY |
| 9 | G3 | LV | G4 | U1 | U2 | G5 | SL | G6 | THIRD | |
| 10 | FE | SE | LB | G1 | R | G2 | $N_m$ | $N_1$ | SECOND | |
| 11 | G3 | LV | G4 | U1 | U2 | G5 | SL | G6 | FOURTH | |
| 12 | FE | SE | LB | G1 | R | G2 | $N_m$ | $N_1$ | SECOND | |
| 13 | FCS | | | | | | | | | |
| 14 | | | | | | | | | FOOTER | |
| 15 | FLAG | | | | | | | | | |

The fields of the PRM may be described as follows:

FLAG: Bytes 1 and 15 are the same as the DL idle code (01111110) and serve to separate the PRM from other signals that can appear on the DL.

SAPI: (Service Access Point Identifier) Bits 3–8 identify the information package as a PRM.

C/R: (Command/Response) Bit 2 in the second byte identifies the source of the PRM. If this bit is set to 1, the PRM was generated from the carrier (central unit) end of the T1 link; if this bit is 0, the PRM was generated from the customer end of the T1 link.

EA: (Extended Address) Bit 1 in bytes 3 and 3 are set to 0 and 1, respectively.

TEI: (Terminal Endpoint Identifier) May be used to identify a device, as discussed in greater detail below.

CONTROL: Byte 4 is set to 00000011 to indicate an unacknowledged frame.

FCS: (Frame Check Sequence) Byte 13 and 14 form a 16-bit Cyclic Redundancy Check (CRC) code word that is calculated on bytes 2–12.

G1–G6: (CRC error events) These 6 bits are used to report CRC error events that have occurred in the reported second.

SE: (Severely Errored framing event) This bit reports severely errored framing events that have occurred in the reported second.

FE: (Frame synchronization Error event) This bit reports frame synchronization error events that have occurred in the reported second.

LV: (Line code Violation event) This bit reports line code violation events that have occurred in the reported second.

LB: (payload LoopBack status) This bit reports wherein the far-end device is in payload loopback.

$N_1$ and $N_m$: (modulus 4 counter) These bits form a 2-bit label for each reported second in the PRM. The individual one-second reports are sequenced through successive PRMs to provide redundancy.

U1, U2, R: Reserved.

Although radio heads 210 of the wireless system 200 of FIG. 2 may be separately connected to COP 220 by respective links in a so-called "hub and spoke" configuration, it is often advantageous to connect radio heads $210_1$, $210_2$, ..., $210_n$ of wireless communications system 200' to a COP 220 in a cascade or "daisy chain" fashion, via uplinks $215_1$, $215_2$, ..., $215_{n-1}$ as shown in FIG. 3. For example, in such a cascade configuration, an "uplink" message, e.g., a PRM, originating from radio head $210_2$ and destined for the COP 220 is first transmitted to radio head $210_1$ over uplink $215_2$, and then transmitted from radio head $210_1$ to the COP 220 over uplink $215_1$. "Downlink" messages, i.e., messages send away from the COP 220, may be conveyed in a similar fashion.

Cascading can be advantageous, as separate connections from each device to the central unit may be eliminated, thus potentially simplifying the wiring of the network and reducing transmission distances for signals. Cascading can also simplify the addition of devices to the network. In addition, if "leased lines" are used, cost of communications in the network may be reduced as the number of leased lines from the central unit may be reduced. For example, cascaded connections may be particularly advantageous in a system in which the COP 220 is located a significant distance from the radio heads $210_1$, $210_2$, ..., $210_n$, e.g., in a separate building or campus. In such a case, a single leased line can be used to connect the COP 220 to one of the radio heads, and the remaining radio heads can be connected in cascade to this one radio head to avoid the need for additional leased lines.

A potential difficulty with using a cascade network configuration lies, however, in identifying which device and/or link to which a message pertains, e.g., in identifying which of the radio heads $210_1$, $210_2$, ..., $210_n$, originally generated a PRM eventually conveyed to the COP 220, or to which communication link it pertains. Although the Q.921 protocol provides the Terminal Endpoint Identifier (TEI) field that can be used to identify a network device, conventional techniques for using this field may suffer from some disadvantages. For example, existing protocols for T1 links used in the aforementioned conventional wireless systems typically require that the TEI field for a PRM be set to a value of zero. The Q.921 Recommendations describe TEI management procedures in which a device is preassigned a TEI value (for TEI values 0–63), or in which a device is dynamically assigned TEI value (64–124) by a message sent by a central unit in response to a request from the device. However, preassigning TEI values to devices may complicate replacement of devices and reconfiguration of the network. Dynamic assignment can obviate some configuration problems, but can increase network traffic due to the negotiation needed to assign TEI values. Accordingly, there is a need for improved techniques for identifying devices and/or messages in a cascaded network configuration.

SUMMARY OF THE INVENTION

The present invention may meet this and other needs by revising Terminal Endpoint Identifiers fields of messages as they are passed along a cascade of devices. According to one embodiment of the present invention, improved differentiation of Performance Report Messages (PRMs) transmitted among cascade devices can be provided by receiving a transmitted PRM at a device, such as a radio head of an indoor wireless communications system, revising the received PRM such that its Terminal Endpoint Identifier (TEI) field is revised according to a predetermined transformation, for example, incremented or decremented, and transmitting the revised PRM on to another device of the cascaded devices. The revised PRM may then be received at the other device, and its revised TEI field used to determine the communications link to which the PRM pertains. The TEI is preferably used in conjunction with a value in the Command/Response (C/R) field of the revised PRM, which indicates whether the PRM pertains to a downlink or uplink. These reference techniques can be generalized to other messages that include TEI and/or C/R fields.

In particular, according to one embodiment of the present invention, a Performance Report Message is received from a first device at a second device. The received Performance Report Message is revised such that a value of a Terminal Endpoint Identifier field in the Performance Report Message is revised according to a predetermined transformation, e.g., by incrementing the value in the Terminal Endpoint Identifier field. The revised Performance Report Message is then transmitted from the second device to a third device. The first, second and third devices may comprise devices of a wireless communications network, such as radio heads and/or a Control Part (COP). The received Performance Report Message is preferably received over a first T1 link connecting the first and second devices, and the revised Performance Report Message is preferably transmitted over a second T1 link connecting the second and third devices. According to another aspect of the present invention, the revised Performance Report Message is received at the third device, at which the revised value of the Terminal Endpoint Identifier field of the received revised Performance Report Message is recovered and a communications link to which the revised Performance Report Message pertains is identified based on the recovered revised value of the Terminal Endpoint Identifier field of the received revised Performance Report Message, preferably in conjunction with a value in a Conmmand/Response field in the received revised Performance Report Message.

According to another aspect of the present invention, devices connected in cascade by respective Integrated Services Digital Network (ISDN) control (D) channels communicate by receiving a message from a first device at a second device. The received message is revised such that a value of a Terminal Endpoint Identifier field in the received message is revised according to a predetermined transformation, e.g., by incrementing the Terminal Endpoint Identifier value. The revised message is then transmitted from the second device to a third device.

According to yet another aspect of the present invention, a communications system includes a first device that transmits a Performance Report Message. A second device, coupled to the first device, receives the transmitted Performance Report Message, revises the received Performance Report Message such that a value of a Terminal Endpoint Identifier field in the Performance Report Message is revised according to a predetermined transformation, and transmits the revised Performance Report Message. A third device, coupled to the second device, receives the transmitted revised Performance Report Message, recovers the revised value of the Terminal Endpoint Identifier field of the received revised Performance Report Message, and identifies a communications link to which the revised Performance Report Message pertains based on the recovered revised value of the Terminal Endpoint Identifier field of the received revised Performance Report Message.

In another embodiment according to the present invention, an Integrated Services Digital Network (ISDN) communications system includes a first device that transmits a message on a first channel. A second device receives the transmitted message on the first channel, revises the received message such that a value of a Terminal Endpoint Identifier field in the received message is revised according to a predetermined transformation; and transmits the revised message on a second channel. A third device receives the transmitted revised message on the second channel, recovers the revised value of the Terminal Endpoint Identifier field of the received revised message, and identifies the revised message as pertaining to the first device based on the recovered revised value of the Terminal Endpoint Identifier field of the received revised message.

In another embodiment according to the present invention, a communications device includes a first communications interface circuit that receives a Performance Report Message on a first communications link. A message processing circuit, operatively associated with the first communications interface circuit, revises the received Performance Report Message such that a value of a Terminal Endpoint Identifier field in the Performance Report Message is revised according to a predetermined transformation. A second communications interface circuit, operatively associated with the message processing circuit, transmits the revised Performance Report Message on a second communications link.

The message processing circuit may also be operative to generate status information relating to at least one of the first and second communications links and to generate a second Performance Report message including the generated status information, and may transmit the second Performance Report Message on the second communications link via the second communications interface circuit.

In yet another embodiment of the present invention, a communications device includes a first communications interface circuit that receives a message on a first communications link. A message processing circuit, operatively associated with the first communications interface circuit, revises the received message such that a value of a Terminal Endpoint Identifier field in the received message is revised according to a predetermined transformation. A second communications interface circuit, operatively associated with the message processing circuit, transmits the revised message on a second communication link.

DETAILED DESCRIPTION OF THE INVENTION

Figure 1:
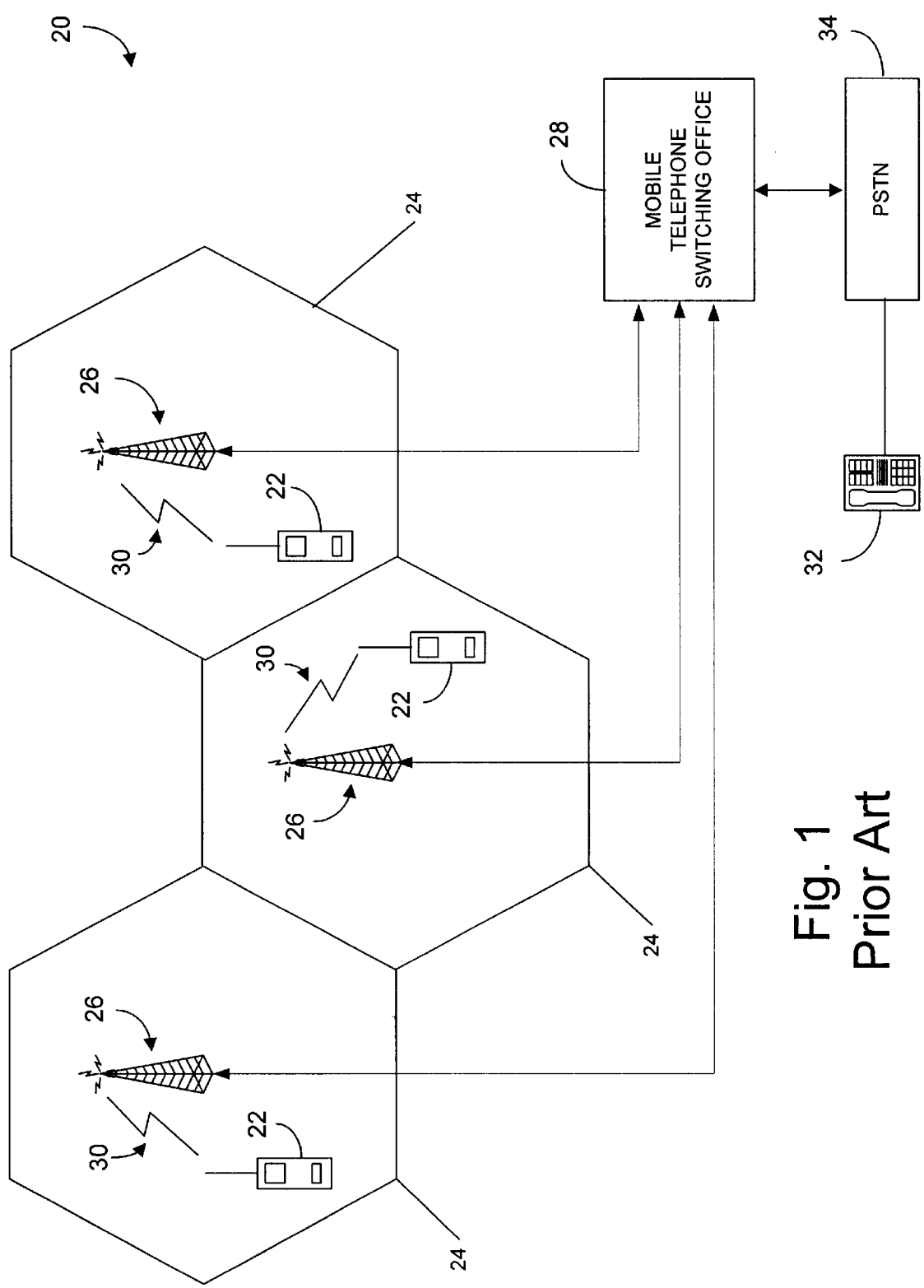
FIG. 1 is a schematic diagram illustrating a terrestrial wireless communications system according to the prior art.
Figure 2:
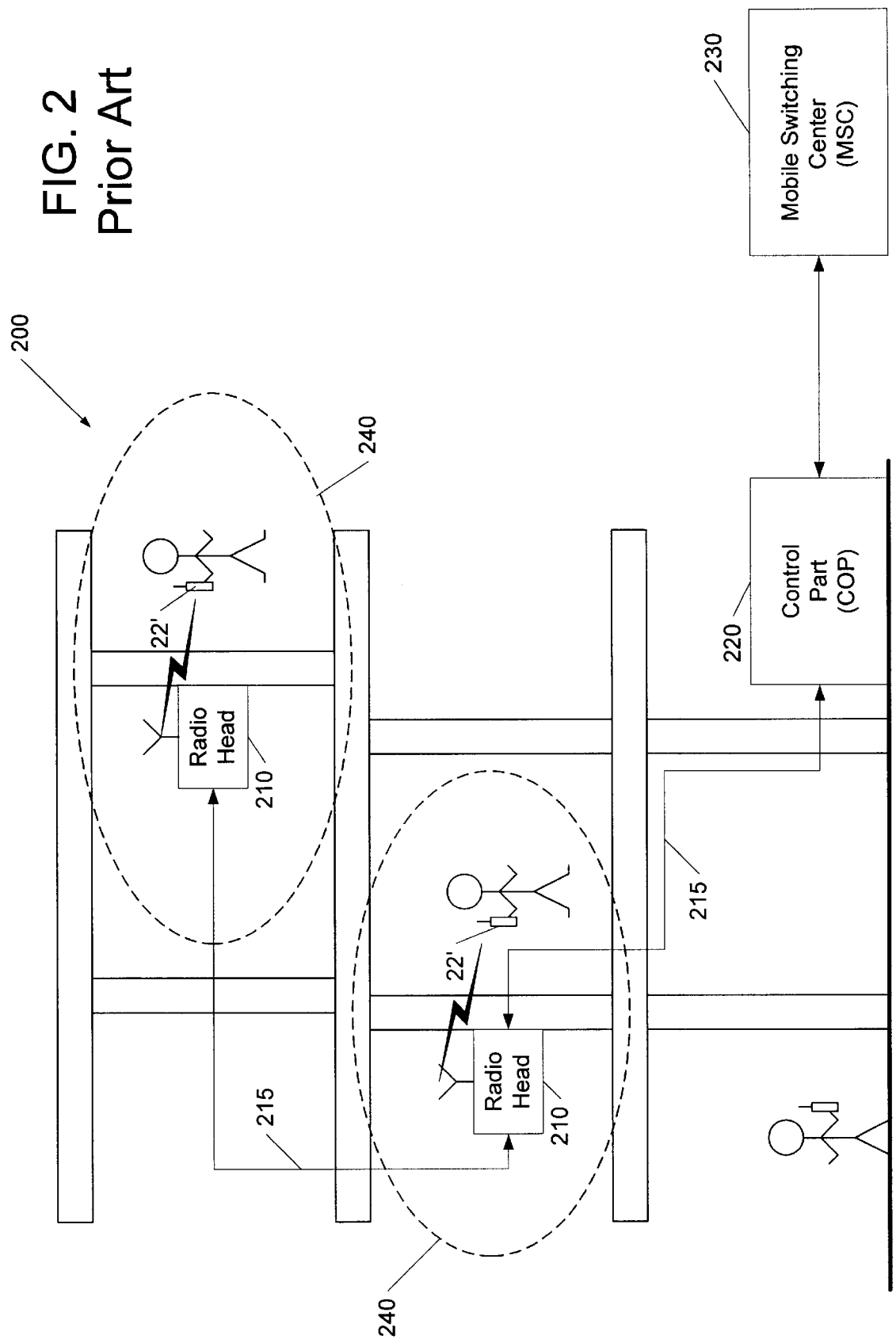
FIGS. 2–3 are a schematic diagram illustrating an indoor wireless communications system according to the prior art.
Figure 3:
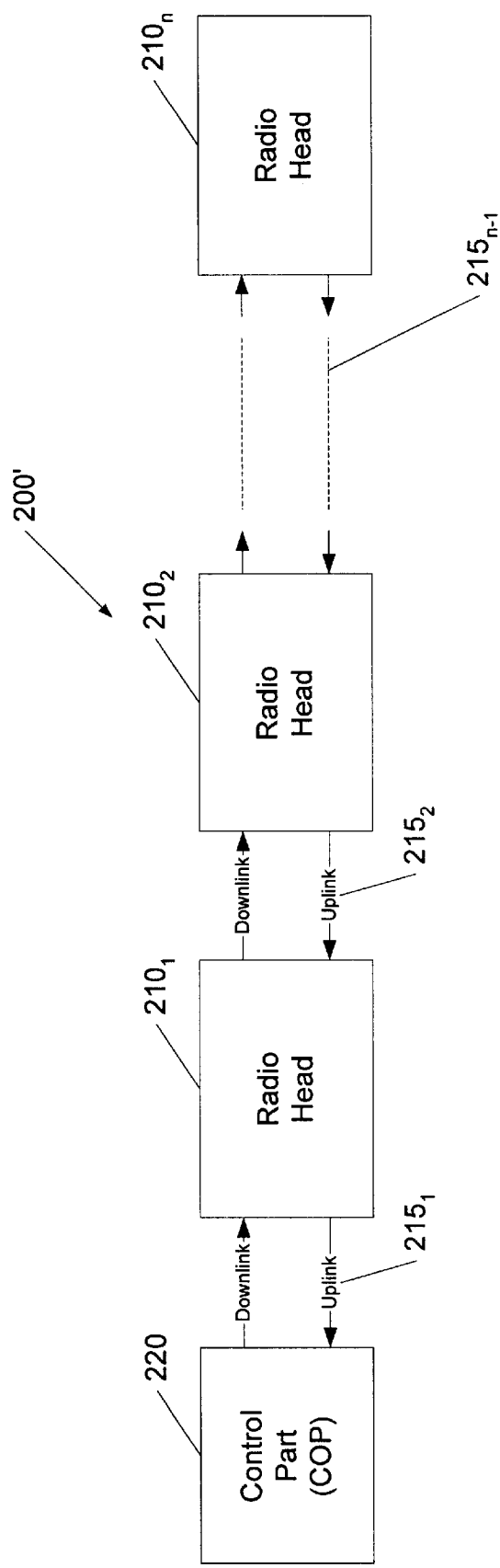

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. Although embodiments of the present invention described herein relate to wireless communications systems, in particular, to wireless systems that employ base stations with distributed radio heads, such as the RBS 884 Pico base station produced by Ericsson, Inc., the assignee of the present application, it will be appreciated by those skilled in the art that the present invention is applicable to other communications systems which include devices connected in cascade, in particular, systems including devices connected in cascade by respective communications links, such as ISDN links.

Figure 4:
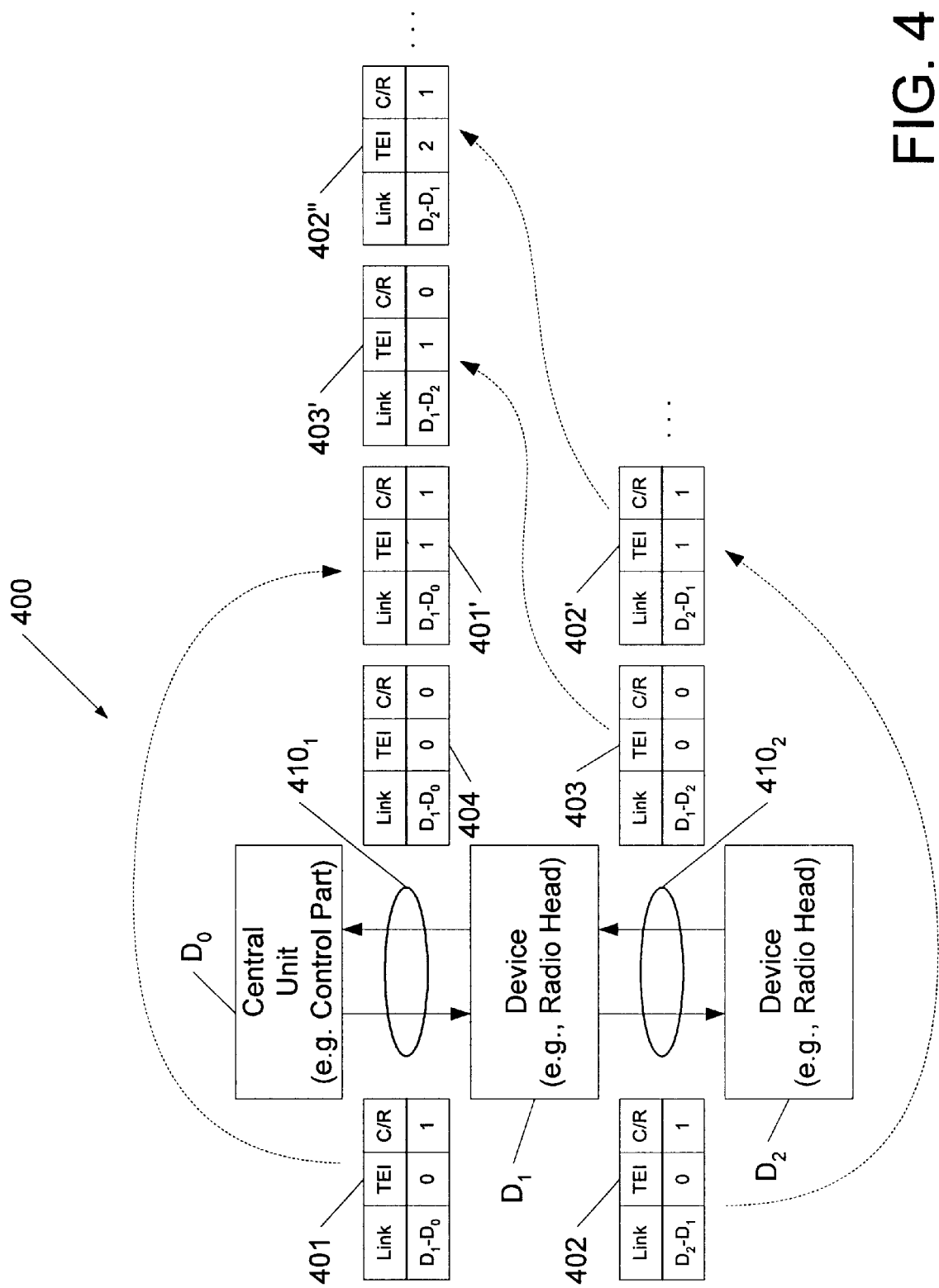
FIG. 4 is a schematic diagram illustrating a cascaded communications system according to an embodiment of the present invention.

FIG. 4 illustrates a communications system 400 according to an embodiment of the present invention. Devices $D_1$, $D_2$, are connected in cascade with a central unit device $D_0$ by communications links 410$_1$, 410$_2$. The devices $D_1$, $D_2$ may comprise, for example, radio heads of an indoor wireless network, while the central unit device $D_0$ may comprise, for example, a Control Part (COP) for such a wireless network.

FIG. 4 also illustrates exemplary Performance Report Message (PRM) transfers among the devices $D_0$, $D_1$, $D_2$. The central unit $D_0$ is operative to generate a PRM 401 that pertains to quality of communications on an uplink from device $D_1$ to the central unit $D_0$. The PRM 401 is transmitted on a downlink from the central unit $D_0$ to the device $D_1$. The Terminal Endpoint Identifier field (TEI) of the original PRM 401 is set to zero. Because the PRM 401 is being transmitted on a downlink, i.e., away from the central unit $D_0$, its Command/Response field (C/R) is set to 1.

Device $D_1$ originates a PRM 404 that pertains to an uplink connecting device $D_1$ to device $D_2$. According to an aspect of the present invention, device $D_1$ is operative to transmit its own originating PRM 404 to the central unit $D_0$, along with a revised PRM 401' corresponding to the PRM 401 originally transmitted to device $D_1$ by the central unit $D_0$. The revised PRM 401' has its TEI value incremented with respect to the TEI value in the original PRM 401 transmitted by the central unit $D_0$. Based on the TEI values of the PRMs 401', 404 received at the central unit $D_0$, the central unit $D_0$ can differentiate as to which communications links the PRMs 401', 404 pertain.

A PRM 402 originated by device $D_1$ and pertaining to an uplink from device $D_2$ to device $D_1$ is treated in a similar fashion. The original PRM 402 has its TEI value initialized to zero and its C/R value set to 1, indicating transmission in the. downlink direction. After reception of the PRM 402 at device $D_2$, device $D_2$ increments the TEI value of the original PRM 402, generating a revised PRM 402' that is transmitted on the uplink between $D_2$ and $D_1$, along with a PRM 403 originated by device $D_2$ that provides information about the link quality of the downlink between device $D_1$ and device $D_2$. These PRMs 403, 402' are then revised by device $D_1$, generating revised PRMs 403', 402" with incremented TEI values. The revised PRMs 403', 402" are passed on to the central unit $D_0$, along with the PRMs 404, 401'.

As mentioned above, the central unit $D_0$ is operative to differentiate between the PRMs 404, 401', 403', 402" based on their respective TEI and C/R values. In the case of PRMs, such as with the illustrated embodiment of FIG. 4, the ability to differentiate between the PRMs 404, 401', 403', 402" provides the central unit to determine which of the links among the devices $D_0$, $D_1$, $D_2$ to which diagnostic information in a particular one of the PRMs 404, 401', 403', 402" pertains.

It will be appreciated, however, that the present invention is not limited to use with PRMs, and is generally applicable to other messages. In general, the present invention can provide a technique for differentiating among messages received at a device via a cascade of devices, and thus can provide a mechanism by which the device can identify which device(s) to which a particular message pertains. It will also be understood that the present invention is applicable to communications among devices other than radio heads, base stations or other elements of a wireless communications systems. For example, the present invention is also applicable to telecommunications devices, computer network devices and, in general, to devices that are connected in cascade using communications links such as ISDN links. It will also be appreciated that the present invention is applicable to cascades of more than three devices as shown in FIG. 4.

Variations in the manner in which TEI values are revised also fall within the scope of the present invention. For example, instead of incrementing TEI values to provide an addressing function, different predetermined transformations of the TEI values may be used, e.g., a device receiving a PRM may decrement, shift or otherwise transform the TEI value of the received message before passing it on to a next device, instead of incrementing the TEI value of the received message. Preferably, each device applies the same transformation, which can simplify, for example, adding or reconfiguring the cascaded devices. However, it will be appreciated that different transformations could be applied by different devices.

Figure 5:
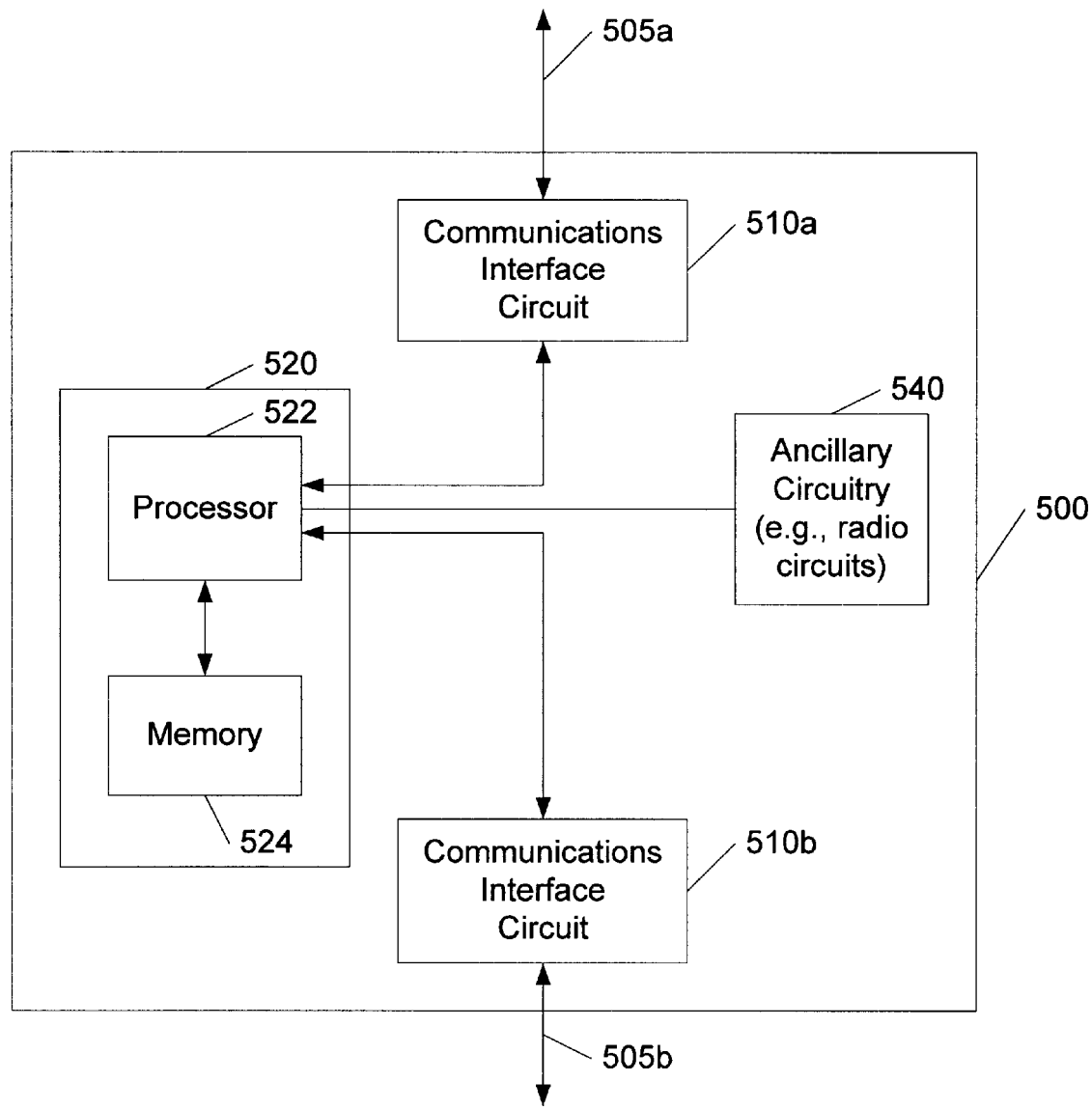
FIG. 5 is a schematic diagram illustrating a communications device according to an embodiment of the present invention.

FIG. 5 illustrates an exemplary communications device 500 according to an embodiment of the present invention. The device 500 includes a message processing circuit 520 and first and second T1 interface circuits 510*a*, 510*b* that are operatively associated with the message processing circuit 520. The device 500 may also include ancillary circuitry 540 which also is operatively associated with the processor 520, such as radio and other circuits which may be present in a radio head or COP of a wireless communications system.

The first and second communications interface circuits 510*a*, 510*b* are operative to send and receive messages, such as ISDN D channel messages, on respective first and second communications (e.g., TI) links 505*a*, 505*b*. These messages may be transferred between the communications interface circuits 510*a*, 510*b* and the message processing circuit 520, in which the message revision and storage operations described herein may be executed. For example, as shown in FIG. 5, the message processing circuit may include a processor 522, such as a microprocessor, microcontroller or similar processing device, that is operatively associated with a memory 524. The processor 522, under control of program instructions stored in the memory 524, may process messages received from the communications interface circuits 510*a*, 520*b*, for example, revise various field values in the messages as described in greater detail in the flowchart descriptions provided below, and store the revised messages in the memory 524. The processor 522, may also retrieve stored messages from the memory 524 and convey the retrieved messages to the communications interface circuits 510*a*, 510*b* for transmission on the communications links 215*a*, 215*b*, as also described in greater detail below. The processor 522 may also be operative to perform various ancillary control and/or communications functions in conjunction with the ancillary circuitry 540. For example, if the ancillary circuitry 540 provides radio reception and transmission functions, the processor 522 may be operative to convey frames received from the communications interfaces 510*a*, 520*b* for transmission by the ancillary circuitry.

The message processing circuit 520 also may be operative to perform various additional functions relating to communications via the communications interface circuits 510*a*, 510*b*. For example, the message processing circuit 520 preferably is operative, in conjunction with the first communications interface circuit 510*a*, to generate PRMs relating to communications quality over the first communications link 505*a*. These generated PRMs may then be transmitted on the second communications link 505*b*, via the second communications interface circuit 510*b*.

It will be appreciated that portions of the message processing circuit 520, interface circuits 510a, 510b, and ancillary circuitry 540 may be implemented in discrete devices and/or integrated circuits such as microprocessors, microcontrollers and special-purpose communications chips. Functions of the message processing circuit 520, interface circuits 510a, 510b, and ancillary circuitry 540 may also be integrated into one or more devices, such as in one or more application specific integrated circuits (ASICs), hybrid circuits, or similar devices. For example, message revising and storing functions of the message processing circuit 520 may be combined with functions of the communications interface circuits 510a, 510b in a single ASIC or other integrated circuit device.

Figure 6:
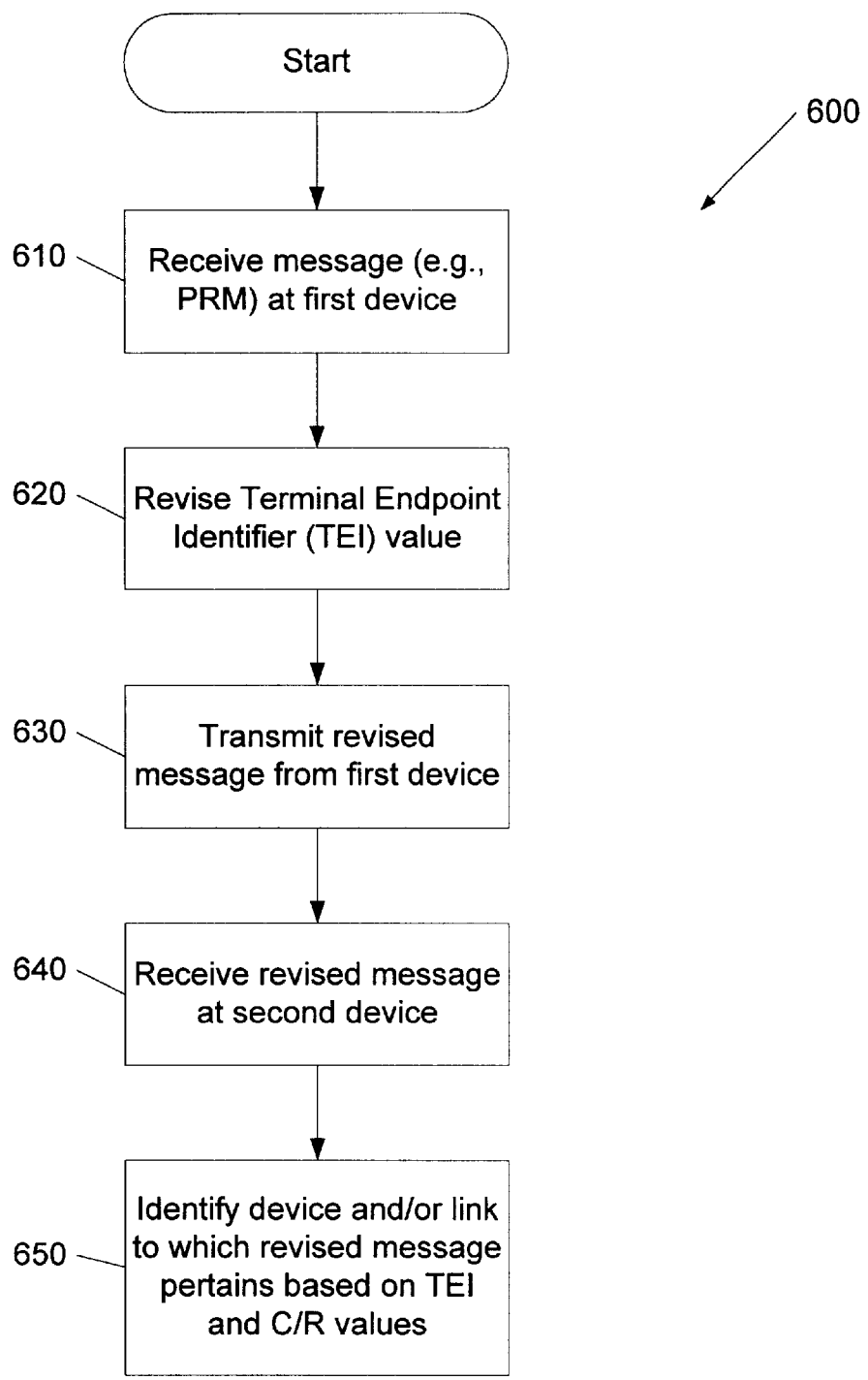
FIGS. 6–7 are flowcharts illustrating exemplary communications operations according to embodiments of the present invention.
Figure 7:
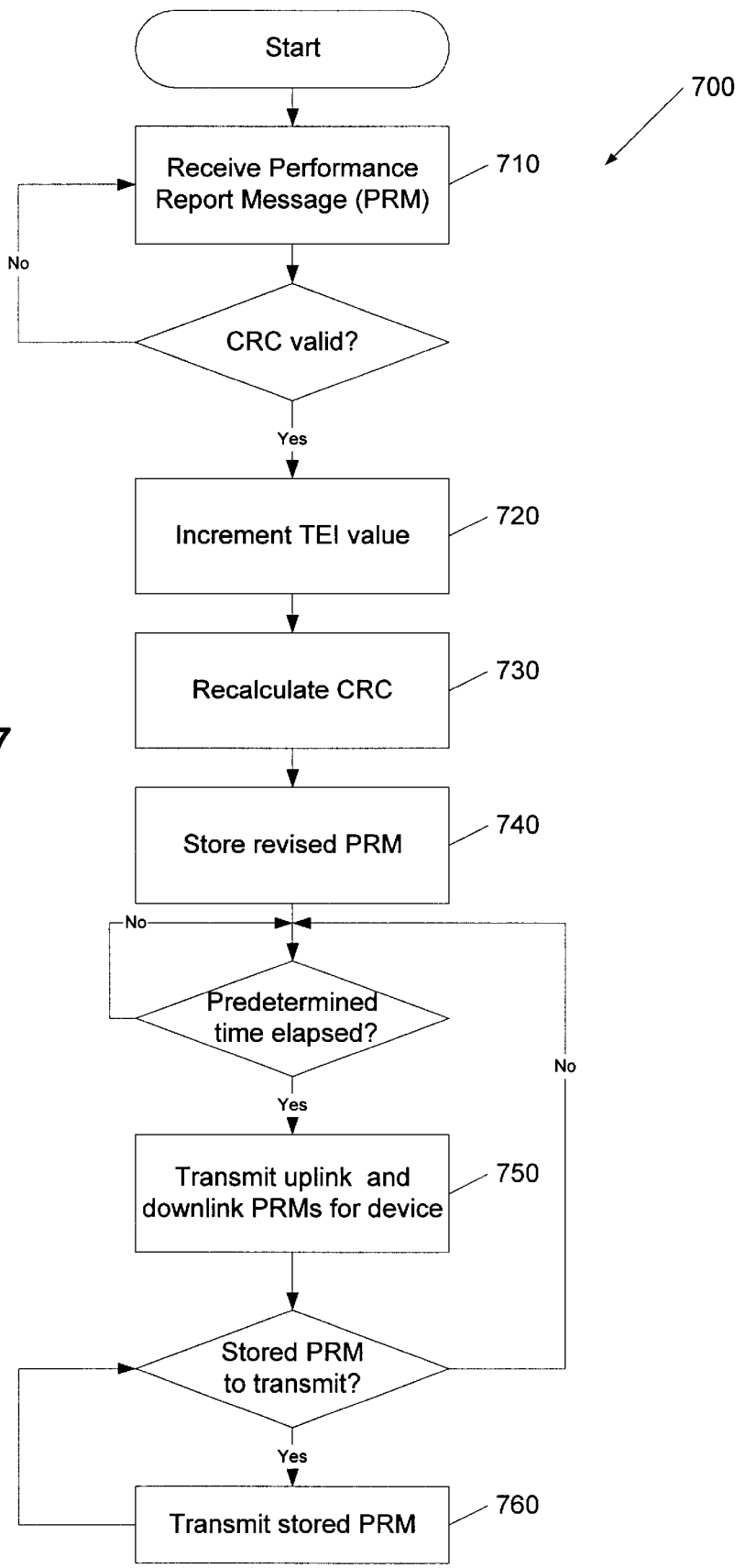

FIGS. 6–7 are flowcharts illustrating exemplary operations for communicating messages in cascaded networks according to embodiments of the present invention. It will be understood that blocks of the flowcharts of FIGS. 6–7, and combinations of blocks in the flowcharts, may be implemented using electronic circuits included in a communications device, such as the device 500 of FIG. 5. It will also be appreciated that blocks of the flowcharts of FIGS. 6–7, and combinations of blocks in the flowcharts, may be implemented using components other than those illustrated herein, and that, in general, the blocks of the flowcharts of FIGS. 6–7, and combinations of blocks in the flowcharts, may be implemented in special purpose hardware such as discrete analog and/or digital circuitry, combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Accordingly, blocks of the flowchart illustrations of FIGS. 6–7 support devices, electronic circuits and other means for performing the specified functions, as well as combinations of steps for performing the specified functions. It will be understood device, circuits and other means supported by each block of the flowcharts of FIGS. 6–7, and combinations of blocks therein, can be implemented by special purpose hardware, software or firmware operating on special or general purpose data processors, or combinations thereof.

FIG. 6 illustrates exemplary operations 600 according to an embodiment of the present invention. A message, such as a PRM, is received at a first device, such as a radio head 210 as shown in FIG. 1 (Block 610). The TEI value in the received message is revised according to a predetermined transformation, for example, incremented, decremented, shifted or otherwise transformed in a predetermined fashion (Block 620). The revised message is then transmitted (630), and received at a second device, e.g., a central unit such as the COP 220 of FIG. 1 (Block 640). A device and/or communications link to which the revised message pertains is identified based on the revised TEI value and the C/R value in the revised message (Block 650).

FIG. 7 illustrates exemplary operations 700 according to another embodiment of the present invention. A PRM is received at a device (Block 710). If the CRC value in the received PRM is invalid, the received PRM is discarded or otherwise disposed of, and the device returns to await the arrival of another PRM (Block 710). If the CRC value in the received PRM is valid, however, the TEI value of the received PRM is incremented (Block 720) and the CRC for the PRM is recalculated (Block 730), resulting in a revised PRM (including the same diagnostic information present in the originally received PRM) which is stored at the device (Block 740).

If a predetermined interval, e.g., the one-second interval typically imposed on the transmission of new PRMs, has elapsed, uplink and downlink PRMs for links connected to the device are generated and transmitted (Block 750). Following transmission of these originating PRMs, the device determines if it has any untransmitted stored PRMs that remain to be transmitted, and transmits them if present (Block 760). If not, the device awaits the beginning of its next reporting interval, at which time newly generated PRMs are transmitted (Block 750).

It will be appreciated that the operations described herein with respect to FIGS. 4–7 may be varied within the scope of the present invention. For example, for the embodiment described with reference to FIG. 4, a given device originates one "downlink" PRM and two "uplink" PRMs. As the PRMs in the embodiments described herein are generated once per second, and transmission of a PRM requires 30 msec, a maximum of 1000/30=30 PRMs may be transmitted on a T1 link in a given reporting interval. However, it will be appreciated that this constraint can be altered by, for example, changing the length of a reporting interval to be greater than one second.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of communicating in a communications system, the method comprising:

receiving a Link Access Protocol D (LAPD) Performance Report Message from a first device at a second device;

revising the received Performance Report Message such that a value of a Terminal Endpoint Identifier field in the Performance Report Message is revised according to a predetermined transformation; and transmitting the revised Performance Report Message from the second device to a third device.

2. The method according to claim 1:

wherein receiving a Performance Report Message from a first device at a second device comprises receiving the Performance Report Message over a T1 link connecting the first and second devices; and wherein transmitting the revised Performance Report Message from the second device to a third device comprises transmitting the revised Performance Report Message over a T1 link connecting the second and third devices.

3. The method according to claim 1, wherein revising the received Performance Report Message such that a value of a Terminal Endpoint Identifier field in the Performance Report Message is revised according to a predetermined transformation comprises incrementing the value in the Terminal Endpoint Identifier field of the received Performance Report Message.

4. The method according to claim 1, wherein the first and second devices comprise respective first and second radio heads of a wireless communications system.

5. The method according to claim 4, wherein the third device comprises one of a third radio head of the wireless communications system or a control part (COP) of the wireless communications system.

6. The method according to claim 1, further comprising:
receiving the transmitted revised Performance Report Message at the third device;
recovering the revised value of the Terminal Endpoint Identifier field of the received revised Performance Report Message; and
identifying a communications link to which the revised Performance Report Message pertains based on the recovered revised value of the Terminal Endpoint Identifier field of the received revised Performance Report Message.

7. The method according to claim 6, wherein the first and second devices comprise respective first and second radio heads of a wireless communications system and wherein the third device comprises a control part (COP) of the wireless communications system.

8. The method according to claim 1:
wherein receiving a Performance Report Message from a first device at a second device comprises receiving a first Performance Report Message;
wherein revising the received Performance Report Message such that a value of a Terminal Endpoint Identifier field in the Performance Report Message is revised according to a predetermined transformation comprises revising the received first Performance Report Message; and
wherein transmitting the revised Performance Report Message from the second device to a third device comprises transmitting the revised first Performance Report Message;
and wherein the method further comprises:
generating status information relating to a communications link serving the second device;
transmitting a second Performance Report message including the generated status information from the second device to the third device.

9. The method according to claim 8, wherein transmitting a second Performance Report message including the generated status information from the second device to the third device follows transmitting the revised first Performance Report Message.

10. The method according to claim 8, wherein transmitting a second Performance Report message including the generated status information from the second device to the third device comprises transmitting the second Performance Report Message with its Terminal Endpoint Indicator field initialized to a predetermined initial value.

11. The method according to claim 1, wherein the first and second devices are connected in cascade with a central unit such that a downlink is defined as a link conveying information away from the central unit and an uplink is defined as a link conveying information toward the central unit, and wherein transmitting the revised Performance Report Message from the second device to a third device comprises transmitting the revised Performance Report Message with its Command/Response field including a value that is dependent upon whether the revised Performance Report Message pertains to an uplink or a downlink.

12. The method according to claim 11, further comprising:
receiving the transmitted revised Performance Report Message at the third device;
recovering the revised value of the Terminal Endpoint Identifier field of the received revised Performance Report Message and the value of the Command/Response field of the received revised Performance Report Message; and
identifying a communications link to which the revised Performance Report Message pertains based on the recovered revised values of the Terminal Endpoint Identifier field and the Command/Response field of the received revised Performance Report Message.

13. The method according to claim 12, wherein the first and second devices comprise respective first and second radio heads of a wireless communications system and wherein the third device comprises a control part (COP) of the wireless communications system.

14. A method of communicating among devices connected in cascade by respective communications links, the method comprising:
receiving a message from a first device at a second device;
revising the received message such that a value of a Terminal Endpoint Identifier field in the received message is revised according to a predetermined transformation;
transmitting the revised message from the second device;
receiving the transmitted revised message at a third device;
recovering the revised value of the Terminal Endpoint Identifier field of the received revised message; and
identifying the revised message as pertaining to the first device based on the recovered revised value of the Terminal Endpoint Identifier field of the received revised message.

15. The method according to claim 14, wherein revising the received message such that a value of a Terminal Endpoint Identifier field in the received message is revised according to a predetermined transformation comprises incrementing the value in the Terminal Endpoint Identifier field of the received message.

16. The method according to claim 14, wherein the first and second devices comprise respective first and second radio heads of a wireless communications system and wherein the third device comprises a control part (COP) of the wireless communications system.

17. The method according to claim 14, wherein the first and second devices are connected in cascade with a central unit such that a downlink is defined as a link conveying information away from the central unit and an uplink is defined as a link conveying information toward the central unit, and wherein transmitting the revised message from the second device to a third device comprises transmitting the revised message with its Command/Response field including a value that is dependent upon whether the revised message is being transmitted on an uplink or a downlink.

18. A communications system, comprising:
a first device that transmits a Link Access Protocol D (LAPD) Performance Report Message;
a second device, coupled to the first device, that receives the transmitted Performance Report Message, revises the received Performance Report Message such that a value of a Terminal Endpoint Identifier field in the Performance Report Message is revised according to a predetermined transformation, and transmits the revised Performance Report Message; and a third device, coupled to the second device, that receives the transmitted revised Performance Report Message, recovers the revised value of the Terminal Endpoint Identifier field of the received revised Performance Report Message, and identifies a communications link to which the revised Performance Report Message pertains based on the recovered revised value of the Terminal Endpoint Identifier field of the received revised Performance Report Message.

19. The system according to claim 18:
wherein the first device and the second device are coupled by a first T1 link; and
wherein the second device and the third device are coupled by a second T1 link.

20. The system according to claim 18, wherein the second device is operative to increment the value in the Terminal Endpoint Identifier field of the received Performance Report Message to generate the revised Performance Report Message.

21. The system according to claim 18, wherein the first and second devices comprise respective first and second radio heads, and wherein the third device comprises one of a third radio head or a control part (COP).

22. The system according to claim 18:
wherein the second device is operative to generate status information relating to a communications link serving the second device and to transmit a second Performance Report Message including the generated status information; and
wherein the third device is operative to receive the second Performance Report Message.

23. The system according to claim 22, wherein the second device is operative to transmit the second Performance Report Message before transmitting the first Performance Report Message.

24. The system according to claim 18, wherein the first and second devices are connected in cascade with a central unit such that a downlink is defined as a link conveying information away from the central unit and an uplink is defined as a link conveying information toward the central unit, and wherein the second unit is operative to transmit the revised Performance Report Message with its Command/Response field including a value that is dependent upon whether the revised Performance Report Message pertains to an uplink or a downlink.

25. The system according to claim 24, wherein the third device is operative to receive the transmitted revised Performance Report Message, to recover the revised value of the Terminal Endpoint Identifier field of the received revised Performance Report Message and the value of the Command/Response field of the received revised Performance Report Message, and to identify a communications link to which the revised Performance Report Message pertains based on the recovered revised values of the Terminal Endpoint Identifier field and the Command/Response field of the received revised Performance Report Message.

26. The system according to claim 24, wherein the first and second devices comprise respective first and second radio heads, and wherein the third device comprises a control part (COP) serving as the central unit.

27. A communications system, comprising:
a first device that transmits a message on a first channel;
a second device that receives the transmitted message on the first channel, revises the received message such that a value of a Terminal Endpoint Identifier field in the received message is revised according to a predetermined transformation;, and transmits the revised message on a second channel; and
a third device that receives the transmitted revised message on the second channel, recovers the revised value of the Terminal Endpoint Identifier field of the received revised message, and identifies the revised message as pertaining to the first device based on the recovered revised value of the Terminal Endpoint Identifier field of the received revised message.

28. The system according to claim 27, wherein the second device is operative to increment the value in the Terminal Endpoint Identifier field of the received message.

29. The system according to claim 27, wherein the first and second devices comprise respective first and second radio heads, and wherein the third device comprises a control part (COP) of the wireless communications system.

30. A communications device, comprising:
a first communications interface circuit that receives a Link Access Protocol D (LAPD) Performance Report Message on a first communications link;
a message processing circuit, operatively associated with the first communications interface circuit, that revises the received Performance Report Message such that a value of a Terminal Endpoint Identifier field in the Performance Report Message is revised according to a predetermined transformation; and
a second communications interface circuit, operatively associated with the message processing circuit, that transmits the revised Performance Report Message on a second communications link.

31. The device according to claim 30:
wherein the first communications interface circuit is operative to receive the Performance Report Message over first T1 link; and
wherein the second communications interface circuit is operative to transmit the revised Performance Report Message over a second T1 link.

32. The device according to claim 30, wherein the message processing circuit is operative to increment the value in the Terminal Endpoint Identifier field of the received Performance Report Message.

33. The device according to claim 30, further comprising a radio communications circuit, operatively associated with the message processing circuit, the first communications interface circuit, and the second communications interface circuit.

34. The device according to claim 30:
wherein the message processing circuit is operative to generate status information relating to at least one of the first and second communications links and to generate a second Performance Report message including the generated status information; and
wherein the second communications interface circuit is operative to transmit the second Performance Report Message on the second communications link.

35. The device according to claim 30, wherein the message processing circuit generates the second Performance Report Message with a Command/Response field including a value that is dependent upon whether the second Performance Report Message pertains to an uplink or a downlink with respect to a central unit.

* * * * *